United States Patent
Wu et al.

(10) Patent No.: US 10,735,161 B2
(45) Date of Patent: Aug. 4, 2020

(54) CHANNEL STATE INFORMATION BASED PROCESSING METHOD, AND RELEVANT DEVICES AND COMPUTER STORAGE MEDIUM

(71) Applicant: ZTE CORPORATION, Shenzhen (CN)

(72) Inventors: Hao Wu, Shenzhen (CN); Yijian Chen, Shenzhen (CN); YuNgok Li, Shenzhen (CN); Zhaohua Lu, Shenzhen (CN); Jianxing Cai, Shenzhen (CN); Huahua Xiao, Shenzhen (CN); Yong Li, Shenzhen (CN); Yuxin Wang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 61 days.

(21) Appl. No.: 16/089,639

(22) PCT Filed: Mar. 27, 2017

(86) PCT No.: PCT/CN2017/078327
§ 371 (c)(1),
(2) Date: Sep. 28, 2018

(87) PCT Pub. No.: WO2017/167160
PCT Pub. Date: Oct. 5, 2017

(65) Prior Publication Data
US 2019/0132099 A1    May 2, 2019

(30) Foreign Application Priority Data

Mar. 31, 2016 (CN) .......................... 2016 1 0200179

(51) Int. Cl.
*H04L 5/00* (2006.01)
*H04L 1/00* (2006.01)
(Continued)

(52) U.S. Cl.
CPC .......... *H04L 5/0048* (2013.01); *H04B 7/0621* (2013.01); *H04L 1/00* (2013.01); *H04W 16/28* (2013.01)

(58) Field of Classification Search
CPC ......... H04B 7/0621; H04L 1/00; H04L 25/02; H04L 5/0048; H04W 16/28
(Continued)

(56) References Cited

U.S. PATENT DOCUMENTS

2013/0028211 A1    1/2013  Li
2014/0056156 A1*   2/2014  Jongren ............... H04B 7/066
                                                    370/252
(Continued)

FOREIGN PATENT DOCUMENTS

CN          103037397 A       4/2013
CN          103220066 A       7/2013
(Continued)

OTHER PUBLICATIONS

International Search Report in the international application No. PCT/CN2017/078327, dated Jun. 9, 2017, 2 pgs.
(Continued)

*Primary Examiner* — Robert J Lopata
(74) *Attorney, Agent, or Firm* — Cantor Colburn LLP

(57) ABSTRACT

Disclosed are a channel state information (CSI) based processing method, and a terminal, a base station and a computer storage medium. The method comprises: a terminal acquiring channel measurement process configuration information, wherein at least one CSI process configuration includes configuring M sets of channel state information reference symbols (CSI-RSs) for channel measurement, with M being an integer greater than or equal to 1; and the terminal determining m sets of CSI-RSs for CSI measure-
(Continued)

|  |  | PMI Feedback Type | | |
|---|---|---|---|---|
|  |  | No PMI | Single PMI | Multiple PMI |
| PUSCH CQI Feedback Type | Wideband (wideband CQI) |  |  | Mode 1-2 |
|  | UE Selected (subband CQI) | Mode 2-0 |  | Mode 2-2 |
|  | Higher Layer-configured (subband CQI) | Mode 3-0 | Mode 3-1 | Mode 3-2 | ment, wherein the m sets of CSI-RSs are a sub-set of the M sets of CSI-RSs, with m being an integer.

17 Claims, 7 Drawing Sheets

(51) Int. Cl.
*H04B 7/06* (2006.01)
*H04W 16/28* (2009.01)

(58) Field of Classification Search
USPC .......................................................... 370/329
See application file for complete search history.

(56) References Cited

U.S. PATENT DOCUMENTS

| | | | |
|---|---|---|---|
| 2014/0086187 A1* | 3/2014 | Kang | H04L 1/0026 370/329 |
| 2014/0211723 A1 | 7/2014 | Xia et al. | |
| 2014/0247789 A1 | 9/2014 | Li et al. | |
| 2015/0003359 A1* | 1/2015 | Hoshino | H04W 24/08 370/329 |
| 2015/0318972 A1* | 11/2015 | Zhang | H04L 5/0057 370/329 |
| 2016/0301505 A1* | 10/2016 | Furuskog | H04B 7/0452 |
| 2017/0126377 A1* | 5/2017 | Chen | H04W 72/04 |
| 2017/0338924 A1* | 11/2017 | Islam | H04L 5/0053 |
| 2018/0083751 A1* | 3/2018 | Seo | H04L 27/26 |
| 2018/0287749 A1* | 10/2018 | Chen | H04L 1/20 |
| 2020/0015109 A1* | 1/2020 | Frenne | H04L 5/0057 |

FOREIGN PATENT DOCUMENTS

| | | |
|---|---|---|
| CN | 103220076 A | 7/2013 |
| CN | 103391150 A | 11/2013 |
| CN | 103812545 A | 5/2014 |
| CN | 104584476 A | 4/2015 |
| WO | 2011140908 A1 | 11/2011 |

OTHER PUBLICATIONS

English Translation of the Written Opinion of the International Search Authority in the international application No. PCT/CN2017/078327, dated Jun. 9, 2017, 6 pgs.

* cited by examiner

|  | | PMI Feedback Type | | |
|---|---|---|---|---|
|  | | No PMI | Single PMI | Multiple PMI |
| PUSCH CQI Feedback Type | Wideband (wideband CQI) |  |  | Mode 1-2 |
|  | UE Selected (subband CQI) | Mode 2-0 |  | Mode 2-2 |
|  | Higher Layer-configured (subband CQI) | Mode 3-0 | Mode 3-1 | Mode 3-2 |

FIG. 1

|  |  | PMI Feedback Type | |
|---|---|---|---|
|  |  | No PMI | Single PMI |
| PUCCH CQI Feedback Type | Wideband (wideband CQI) | Mode 1-0 | Mode 1-1 |
|  | UE Selected (subband CQI) | Mode 2-0 | Mode 2-1 |

FIG. 2

CHANNEL STATE INFORMATION BASED PROCESSING METHOD, AND RELEVANT DEVICES AND COMPUTER STORAGE MEDIUM

TECHNICAL FIELD

Embodiments of the disclosure relate to the field of wireless communication technologies, and in particular to a processing method based on channel state information (CSI), a terminal, a base station and a computer storage medium.

BACKGROUND

In a wireless communication system, a sending end and a receiving end may generally adopt multiple antennas for sending and receiving so as to acquire a higher rate. One principle of multi-antenna technology is to form multi-layer transmission matching with channel characteristics by taking advantage of some characteristics of a channel, and a radiation direction of a signal is highly targeted, which may effectively improve performance of a system, and the performance is significantly improved without increasing bandwidth and power. The multi-antenna technology is a very promising technology and has been widely applied to existing systems. Data transmission performance of a multi-antenna system mainly depends on measurement and feedback of channel information. Therefore, the measurement and feedback of the channel information are core contents of the multi-antenna system, and it becomes an important problem on how to ensure accuracy of channel measurement and channel information feedback, overhead and robustness.

The measurement and feedback of CSI are designed simply in an early long term evolution (LTE) system. However, with increasing requirement of accuracy, a pilot overhead, a feedback overhead and quantification complexity are not expected to increase significantly. Therefore, a measurement and feedback technology of the CSI becomes more and more complicated so as to achieve higher quantification efficiency. In addition, a plenty of new designs are introduced because a good adaptability is required for a variety of scenarios and antenna configurations.

The inventors, during inventing the disclosure, find that the measurement and feedback of the CSI in the conventional art has at least following disadvantages.

A base station periodically sends a precoding pilot (beamformed channel state information reference signal, BFed CSI-RS) and each feedback is based on identical CSI-RS resource configuration. However, the sending of the CSI-RS and the feedback of the CSI cannot be changed flexibly according to a channel state.

In addition, the base station semi-statically configures a BFed CSI-RS through a radio resource control (RRC) signaling. The BFed CSI-RS does not be changed for a long time after the configuration, which accordingly lacks flexibility of adapting dynamic changes of the channel.

SUMMARY

In order to solve the above-mentioned technical problems, embodiments of the disclosure provide a processing method based on channel state information (CST), a terminal, a base station and a computer storage medium.

The embodiments of the disclosure provide a processing method based on CSI, which includes the following operations.

The terminal acquires configuration information of a channel measurement process, herein, at least one CSI process configuration includes M sets of channel state information reference signals (CSI-RSs) for channel measurement, and M is an integer which is greater than or equal to 1. The terminal determines sets of CSI-RSs for CSI measurement, herein the m sets of CSI-RSs form a subset of the M sets of CSI-RSs, and in is an integer.

In the above solution, the M sets of CSI-RSs include at least $K_1$ kinds of Class-I CSI-RS pilot resources and $K_2$ kinds of Class-II CSI-RS pilot resources; herein $K_1$ is greater than or equal to 1, and $K_2$ is greater than or equal to 1. The method further includes: the terminal determines a pilot set for measurement of channel information according to the $K_1$ kinds of Class-I CSI-RS pilot resources and the $K_2$ kinds of Class-II CSI-RS pilot resources, and performs CSI measurement feedback according to pilots in the pilot set.

In the above solution, the pilot set includes one of: $k_1$ kinds of Class-I pilots in the $K_1$ kinds of Class-I CSI-RS pilot resources ($k_1 \leq K_1$), $k_2$ kinds of Class-II pilots in the $K_2$ kinds of Class-II CSI-RS pilot resources ($k_2 \leq K_2$), or $k_1$ kinds of Class-I pilots in the $K_1$ kinds of Class-I CSI-RS pilot resources and $k_2$ kinds of Class-II pilots in the $K_2$ kinds of Class-II CSI-RS pilot resources ($k_1 \leq K_1$, $k_2 \leq K_2$).

In the above solution, the terminal determines the pilots in the pilot set according to at least one of: a configuration signaling of a base station, herein the configuration signaling includes a downlink control information (DCI) signal or a radio resource control (RRC) signaling, a time domain sending position of the CSI that needs to be fed back, a number of processes that need to be reported simultaneously, or a feedback type which includes periodic feedback or non-periodic feedback.

In the above solution, the terminal determines a value of $k_1$ according to sending situation of the $K_1$ kinds of Class-I CSI-RS pilot resources within a time range T; or the terminal determines a value of $k_2$ according to sending situation of the $K_2$ kinds of Class-II CSI-RS pilot resources within a time range T; or the terminal and a base station agree on at least one of $p_1 = P_1$ or $p_2 = P_2$, and agree on at least one of $k_1 = K_1$ or $k_2 = K_2$.

In the above solution, classification of the Class-I CSI-RS pilot resources and the Class-II CSI-RS pilot resources includes one of: way 1: $K_1$ sets of periodic CSI-RS resources, and $K_2$ sets of non-periodic CSI-RS resources; way 2: $K_1$ sets of CSI-RS resources for physical uplink control channel (PUCCH) feedback, and $K_2$ sets of CSI-RS resources for physical uplink shared channel (PUSCH) feedback; way 3: $K_1$ sets of CSI-RS resources using a Class-I measurement restriction (MR) mode, and $K_2$ sets of CSI-RS resources using a Class-II MR mode; way 4: $K_1$ sets of CSI-RS resources configured with a period $T_1$ and $K_2$ sets of CSI-RS resources configured with a period $T_2$; way 5: $K_1$ sets of CSI-RS resources configured with a Class-I trigger mode, and $K_2$ sets of CSI-RS resources configured with a Class-II trigger mode; way 6: periodic CSI-RS resources of $K_1$ ports and non-periodic CSI-RS resources of $K_2$ ports; way 7: CSI-RS resources of the $K_1$ ports for the PUCCH feedback and CSI-RS resources of the $K_2$ ports for the PUSCH feedback; way 8: CSI-RS resources using the Class-I MR mode and of the $K_1$ ports, and CSI-RS resources using the Class-II MR mode and of the $K_2$ ports; way 9: CSI-RS resources configured with the period $T_1$ and of the $K_1$ ports, and CSI-RS resources configured with the period $T_2$ and of the $K_2$ ports; or way 10: CSI-RS resources configured with the Class-I trigger mode and of the $K_1$ ports, and CSI-RS resources configured with the Class-II trigger mode and of the $K_2$ ports.

In the above solution, the terminal performs CSI measurement feedback according to the pilots in the pilot set includes: when the ways of classification use one of the ways 1-5, the terminal feeds back a CSI-RS resource index (CRI) through $\log_2(k_1+k_2)$ bit information, or feeds back a CRI through $\log_2(k_2)$ bit information, or feeds back a CRI through $\log_2(k_1)$ bit information.

The embodiments of the disclosure further provide a processing method based on CSI, which includes the following operations.

A base station configures configuration information of a channel measurement process, herein, at least one CSI process configuration includes M sets of CSI-RSs for channel measurement, and M is an integer which is greater than or equal to 1. The base station configures m sets of CSI-RSs for CSI measurements, herein, the in sets of CSI-RSs form a subset of the M sets of CSI-RSs, and m is an integer.

In the above solution, the M sets of CSI-RSs include at least $K_1$ kinds of Class-I CSI-RS pilot resources and $K_2$ kinds of Class-II CSI-RS pilot resources; herein, $K_1$ is greater than or equal to 1, and $K_2$ is greater than or equal to 1. The method further includes: the base station configures a pilot set for measurement of channel information according to the $K_1$ kinds of Class-I CSI-RS pilot resources and the $K_2$ kinds of Class-II CSI-RS pilot resources.

In the above solution, the pilot set includes one of: $k_1$ kinds of Class-I pilots in the $K_1$ kinds of Class-I CSI-RS pilot resources ($k_1 \leq K_1$), $k_2$ kinds of Class-II pilots in the $K_2$ kinds of Class-II CSI-RS pilot resources ($k_2 \leq K_2$), or $k_1$ kinds of Class-I pilots in the $K_1$ kinds of Class-I CSI-RS pilot resources and $k_2$ kinds of Class-II pilots in the $K_2$ kinds of Class-II CSI-RS pilot resources ($k_1 \leq K_1$, $k_2 \leq K_2$).

In the above solution, the base station informs the terminal of pilots in the pilot set according to at least one of: a configuration signaling of the base station, herein, the configuration signaling includes a DCI signal or an RRC signal, a time domain sending position of the CSI that needs to be fed back, a number of processes that need to be reported simultaneously, or a feedback type which includes periodic feedback or non-periodic feedback.

In the above solution, classification of the Class-I CSI-RS pilot resources and the Class-II CSI-RS pilot resources includes one of: way 1: $K_1$ sets of periodic CSI-RS resources, and $K_2$ sets of non-periodic CSI-RS resources; way 2: $K_1$ sets of CSI-resources for PUCCH feedback, and $K_2$ sets of CSI-RS resources for PUSCH feedback; way 3: $K_1$ sets of CSI-RS resources using a Class-I MR mode, and $K_1$ sets of CSI-RS resources using a Class-II MR mode; way 4: $K_1$ sets of CSI-RS resources configured with a period $T_1$ and $K_2$, sets of CSI-RS resources configured with a period $T_2$; way 5: $K_1$ sets of CSI-RS resources configured with a Class-I trigger mode, and $K_7$ sets of CSI-RS resources configured with a Class-II trigger mode; way 6: periodic CSI-RS resources of $K_1$ ports and non-periodic CSI-RS resources of $K_2$ ports; way 7: CSI-RS resources of the $K_1$ ports for the PUCCH feedback and CSI-RS resources of the $K_2$ ports for the PUSCH feedback; way 8: CSI-RS resources using the Class-I MR mode and of the $K_1$ ports, and CSI-RS resources using the Class-II MR mode and of the $K_2$ ports; way 9: CSI-RS resources configured with the period $T_1$ and of the $K_1$ ports, and CSI-RS resources configured with the period $T_2$ and of the $K_2$ ports; or way 10: CSI-RS resources configured with the Class-I trigger mode and of the $K_1$ ports, and CSI-RS resources configured with the Class-II trigger mode and of the $K_2$ ports.

The embodiments of the disclosure further provide a terminal, which includes a first communication interface and a first processor.

The first communication interface is configured to acquire configuration information of a channel measurement process. Herein, at least one CSI process configuration includes M sets of CSI-RSs for channel measurement, and M is an integer which is greater than or equal to 1.

The first processor is configured to determine in sets of CSI-RSs for CSI measurement, herein, the m sets of CSI-RSs form a subset of the M sets of CSI-RSs, and m is an integer.

In the above solution, the M sets of CSI-RSs include at least $K_1$ kinds of Class-I CSI-RS pilot resources and $K_2$ kinds of Class-II CSI-RS pilot resources. Herein, $K_1$ is greater than or equal to 1, and $K_2$ is greater than or equal to 1.

The first processor is further configured to determine a pilot set for measurement of channel information according to the $K_1$ kinds of Class-I CSI-RS pilot resources and the $K_2$ kinds of Class-II CSI-RS pilot resources, and perform CSI measurement feedback through the first communication interface according to pilots in the pilot set.

The embodiments of the disclosure further provide a base station which includes a second communication interface and a second processor.

The second processor is configured to configure configuration information of a channel measurement process through the second communication interface; herein, at least one CSI process configuration includes M sets of CSI-RSs for channel measurement, and M is an integer which is greater than or equal to 1. The second processor is further configured to configure m sets of CSI-RSs for CSI measurement; herein, the m sets of CSI-RSs form a subset of the M sets of CSI-RSs, and m is an integer.

In the above solution, the M sets of CSI-RSs include at least $K_1$ kinds of Class-I CSI-RS pilot resources and kinds of Class-II CSI-RS pilot resources. Herein, $K_1$ is greater than or equal to 1, and $K_2$ is greater than or equal to 1.

The second processor is further configured to configure a pilot set for measurement of channel information through the second communication interface according to the $K_1$ kinds of Class-I CSI-RS pilot resources and the $K_2$ kinds of Class-II CSI-RS pilot resources.

The embodiments of the disclosure further provide a computer storage medium. The computer storage medium includes a group of instructions that when executed by at least one processor, cause the at least one processor to perform the processing method based on CSI on the terminal side described above, or implement the processing method based on CSI on the base station side described above.

Compared with the conventional art, the embodiments of the disclosure include: the terminal acquires the configuration information of the channel measurement process, herein, at least one CSI process configuration includes M sets of CSI-RSs for channel measurement; and M is an integer which is greater than or equal to 1; and the terminal determines m sets of CSI-RSs for CSI measurement; herein, the m sets of CSI-RSs form one subset of the M sets of CSI-RSs, and m is an integer. In this way, CSI-RS sending and CSI feedback may be flexibly changed according to a channel state.

Other characteristics and advantages of the embodiments of the disclosure will be clarified in the subsequent description and become apparent partially in the description, or may be known through execution of the disclosure. The purpose and other advantages of the embodiments of the disclosure may be implemented and acquired through structures particularly pointed out in the description, claims and drawings.

BRIEF DESCRIPTION OF DRAWINGS

Drawings are used to provide further understanding of the technical solutions of the disclosure, constitute a part of the description and are used to explain the technical solutions of the disclosure in combination with embodiments of the application.

FIG. 1 illustrates a schematic diagram of modes of a non-periodic feedback in a PUSCH.

FIG. 2 illustrates a schematic diagram of modes of a periodic feedback in a PUCCH.

DETAILED DESCRIPTION

Figure 3:
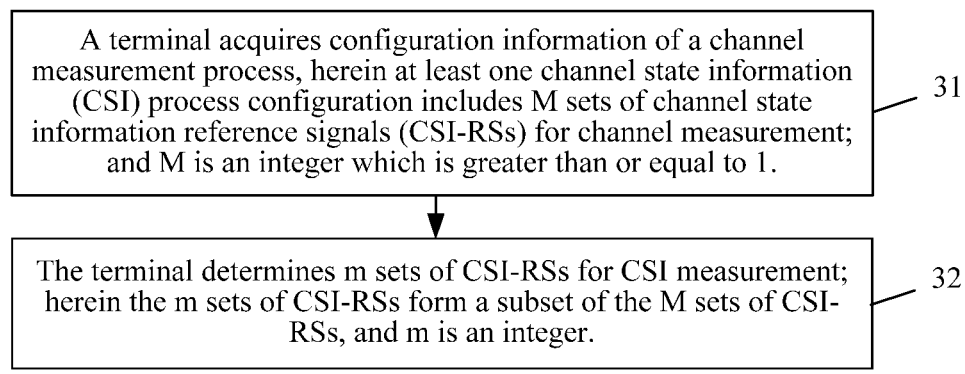
FIG. 3 illustrates a flow diagram of a processing method based on CSI in embodiments of the disclosure.

In order to make the purposes, technical solutions and advantages of the disclosure clearer, the embodiments of the disclosure will be further described below in combination with drawings in detail. It is to be noted that the embodiments in the disclosure may be combined with characteristics in the embodiments freely in case there is no confliction with each other.

Operations illustrated in the flowcharts of the drawings may be implemented in a computer system including such as a group of computer executable instructions. Furthermore, although the flowcharts illustrate a logic order, the illustrated or described operations may be implemented under certain situations in an order that is different from the logic order illustrated in the flowcharts.

In order to better know the technical solutions of the disclosure, basic contents related to measurement of and quantification feedback of CSI will be introduced first.

A CSI measurement reference signal, namely CSI-RS, may be applied to measurement of downlink channel information. CSI-RS may be divided into two categories: Non-Precoding Pilot (NP CSI-RS) and precoding pilot (BFed CSI-RS), As for the NP CSI-RS, a base station acquires the CSI through a manner in which the base station sends pilots at all ports, and a user receives the pilots, measures and feeds back the channel information. As for the BFed CSI-RS, the base station configures precoding matrixes for different port groups and loads the CSI-RS on the precoding matrixes on K sets of CSI-RS resources, for sending (K is greater than or equal to 1); and the user measures an equivalent channel and feeds back the CSI on the best CSI-RS resource.

Feedback modes of CSI: one is that the base station may configure a terminal to measure and quantify the channel information and periodically feed back the quantified CSI information (including rank indicator (RI)/precoding matrix indicator (PMI)/channel quality indicator (CQI) information) through a PUCCH. The other is that the base station may further trigger the terminal aperiodically and suddenly if necessary to report the CSI information (including RI/PMI/CQI), so as to overcome the problems that periodic feedback does not have high real-time quality, and CSI quantification accuracy is limited by overhead of a control channel.

Feedback types of CSI: one is Class A, i.e., the base station sends the CSI-RS that is the non-precoding pilot generally; and user equipment (UE) directly performs channel measurement and CSI quantification on the basis of the CSI-RS pilots to acquire RI/PMI/CQI. These contents including RI/PMI/CAI are fed back on the PUCCH or a PUSCH. There are many contents for feedback, including a beam direction of a wideband. The other is Class B, i.e., the base station sends the CSI-RS that is a precoding pilot generally, and the UE may need to select the precoding pilot first and then perform quantification feedback of the channel information based on the selected CSI-RS pilot, including CSI-RS CRI selection information and RI/PMI/CQI information corresponding to a CSI-RS measurement resource subset selected.

Basic principle of channel information quantification feedback based on a codebook is briefly described as follows. Supposing that a capacity of a limited feedback channel is B bps/Hz, a number N of available code words is $2^B$. A feature vector space of a channel matrix, through quantification, forms a codebook space $R=\{F_1, F_2 \ldots F_N\}$. A sending end and a receiving end jointly store the codebook R or generate the codebook R (a sending end and a receiving end have identical codebook) in real time. For implementation of each channel H, the receiving end selects a code word $\hat{F}$ that best matches with implementation of the channel H from a codebook space R according to certain criteria, and feeds back a serial number i (the serial number of the code word) of the code word $\hat{F}$ to the sending end. Here, the serial number of the code word is called PMI in the codebook. The sending end may find a corresponding precoding code word $\hat{F}$ according to the serial number i and accordingly acquire the corresponding channel information. $\hat{F}$ represents the feature vector information of the channel. Here, the channel H is generally acquired through the channel measurement according to a channel measurement pilot.

Generally, the codebook space R may be further divided into the codebooks corresponding to multiple ranks; and each rank corresponds to multiple code words to quantify the precoding matrix formed by the feature vectors of the channel under this rank. Because the rank of the channel is equal to the number of non-zero feature vectors, there are N columns of code words generally when the rank is N. Therefore, the codebook space R may be divided into multiple sub-codebooks according to different ranks, as illustrated in Table 1.

TABLE 1

| | R | | |
| --- | --- | --- | --- |
| | Rank V | | |
| 1 | 2 | ... | N |
| $R_1$ Vector set of 1 column of code words | $R_2$ Matrix set of 2 columns of code words | ... | $R_N$ Matrix set of N columns of code words |

Herein, the code words needing to be stored are in form of matrix when rank is greater than 1. The codebook in a LTE protocol uses the feedback method of codebook quantification and actually the precoding codebook in the LTE has the meaning that is identical to that of a channel information quantification codebook. For the sake of uniformity, a vector may also be taken as one matrix with a dimension of 1. In addition, there may be multiple sets of available codebooks for selection so as to quantify in different scenarios with different accuracies.

CSI feedback modes refer to an instruction combination of CSI (RI/PMI/CQI) feedback, which include subband feedback, wideband feedback and selected M subbands for feedback, and include periodical feedback and non-periodic feedback.

The non-periodic feedback is transmitted in the PUSCH, which includes the modes illustrated in FIG. 1.

The periodical feedback refers to feeding back periodically in the PUCCH, which includes the modes shown in FIG. 2.

Channel rank indication disabling (RI disabling) is that in a multiple-input multiple-output (MIMO) system, whether the UE reports the rank of the MIMO channel when the UE reports the CSI. For example, there is no need for the UE to feed back the RI in the scenario of a downlink channel obtained through reciprocity of an uplink channel in open-loop spatial multiplexing, spatial diversity or time division duplexing (TDD). Accordingly, RI disabling may be enabled, and a feedback overhead may be saved.

Precoding matrix indicator disabling (PMI disabling) is that in the MIMO system, whether the UE reports a precoding index of the MIMO when the UE reports the CSI. For example, there is no need for the UE to feed back the PMI in the scenario of a downlink channel obtained through reciprocity of an uplink channel in open-loop spatial multiplexing, spatial diversity or TDD or in the scenario in which the feedback mode is X-0. Accordingly, PMI disabling may be enabled, and the feedback overhead may be saved.

CSI feedback dimension: for example, the base station configures K sets of pilots in one CSI, and each set of pilots corresponds to Nk CSI-RS resource sets. A dimension L (the number of rows of the vector or matrix) of the PMI in the CSI may be equal to a total number of ports configured for one set of CSI-RSs: L=sum(Nk) for all k, or L=Nk, or L<Nk (which is configured by the base station through signaling or determined by the UE), and CSI quantification complexities and overheads corresponding to different feedback dimensions are different.

In order to solve the problems that CSI-RS sending and CSI feedback may not be changed flexibly according to the channel state in the conventional art, and flexibility of adapting a dynamic change of the channel is lacking, the embodiments of the disclosure provide a processing method based on CSI and a device.

FIG. 3 illustrates a processing method based on CSI of the embodiments of the disclosure. The method is applied to a terminal and includes the following operations.

At 31, the terminal acquires configuration information of a channel measurement process. Herein, at least one CSI process configuration includes M sets of CSI-RSs for channel measurement, and M is an integer which is greater than or equal to 1.

At 32, the terminal determines m sets of CSI-RSs for CSI measurement. Herein, the m sets of CSI-RSs form a subset of the M sets of CSI-RSs, and m is an integer.

In one specific implementation mode of the disclosure, the M sets of CSI-RSs include at least $K_1$ kinds of Class-I CSI-RS pilot resources and $K_2$ kinds of Class-II CSI-RS pilot resources. Herein, $K_1$ is greater than or equal to 1, and $K_2$ is greater than or equal to 1.

The method further includes the following operations.

The terminal determines a pilot set for measurement of channel information according to the $K_1$ kinds of Class-I CSI-RS pilot resources and the $K_2$ kinds of Class-II CSI-RS pilot resources, and performs CSI measurement feedback according to pilots in the pilot set.

The terminal determines the pilots in the pilot set according to at least one of: a configuration signaling of a base station, herein, the configuration signaling includes a DCI signal or an RRC signal, a time domain sending position of the CSI that needs to be fed back, a number of processes that need to be reported simultaneously, or a feedback type which includes periodic feedback or non-periodic feedback.

The pilot set includes one of: $k_1$ kinds of Class-I pilots in the $K_1$ kinds of Class-I CSI-RS pilot resources, $k_1 \leq K_1$; $k_2$ kinds of Class-II pilots in the K kinds of Class-II CSI-RS pilot resources, $k_2 K_2$; or $k_1$ kinds of Class-I pilots in the $K_1$ kinds of Class-I CSI-RS pilot resources and $k_2$ kinds of Class-II pilots in the $K_2$ kinds of Class-II pilot resources, and $k_1 \leq K_1$, $k_2 \leq K_2$.

Specifically, the terminal determines a value of $k_1$ according to sending situation of the $K_1$ kinds of Class-I CSI-RS pilot resources within a time range T, and determines a value of $k_2$ according to sending situation of the $K_2$ kinds of Class-II CSI-RS pilot resources within the time range T. In addition, a base station and the terminal may agree on at least one of $k_1=K_1$ or $k_2=K_2$.

The CSI measurement feedback is performed according to the pilots in the pilot set includes: the terminal feeds back a CRI through $\log_2(k_1+k_2)$ bit information, or the terminal feeds back a CRI through $\log_2(k_2)$ bit information, or the terminal feeds back a CRI through $\log_2(k_1)$ bit information.

Figure 4:
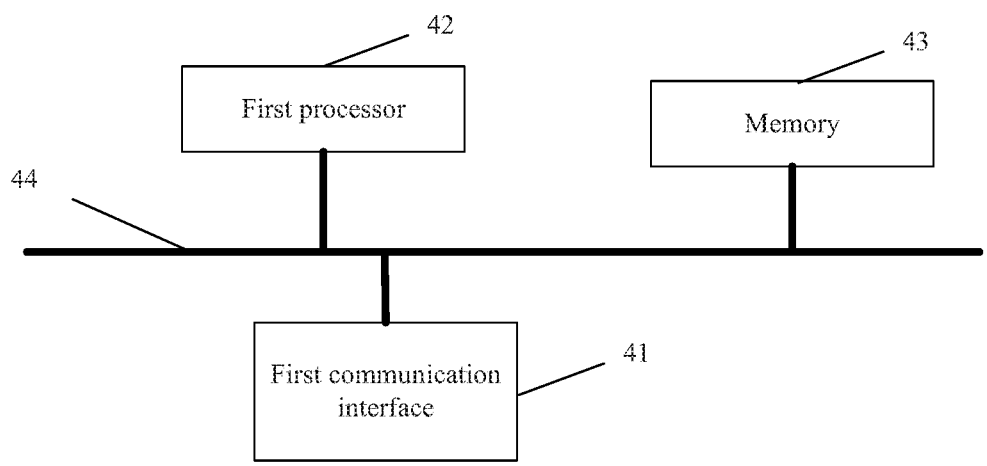
FIG. 4 illustrates a structure diagram of a terminal in embodiments of the disclosure.

The embodiments of the disclosure further provide a terminal corresponding to the method illustrated in FIG. 3. As illustrated in FIG. 4, the terminal includes a first communication interface 41 and a first processor 42.

The first communication interface 41 is configured to acquire configuration information of a channel measurement process, herein at least one CSI process configuration includes M sets of CSI-RS for channel measurement, and M is an integer which is greater than or equal to 1.

The first processor 42 is configured to determine m sets of CSI-RSs for CSI measurement, herein the m sets of CSI-RSs form a subset of the M sets of CSI-RSs, and m is an integer.

The M sets of CSI-RSs include at least $K_1$ kinds of Class-I CSI-RS pilot resources and $K_2$ kinds of Class-II CSI-RS pilot resources; herein, $K_1$ is greater than or equal to 1, and $K_2$ is greater than or equal to 1.

The first processor 42 is further configured to determine a pilot set for measurement of channel information according to the $K_1$ kinds of Class-I CSI-RS pilot resources and the $K_2$ kinds of Class-II CSI-RS pilot resources, and perform CSI measurement feedback through the first communication interface 41 according to pilots in the pilot set.

It is to be noted that those skilled in the art should understand implementation functions of all units in the terminal illustrated in FIG. 4 may be understood with reference to relevant description of the above-mentioned method.

In addition, during actual application, the terminal further includes a memory 43; and the first processor 42, the memory 43 and the first communication interface 41 are connected through a bus 44.

Figure 5:
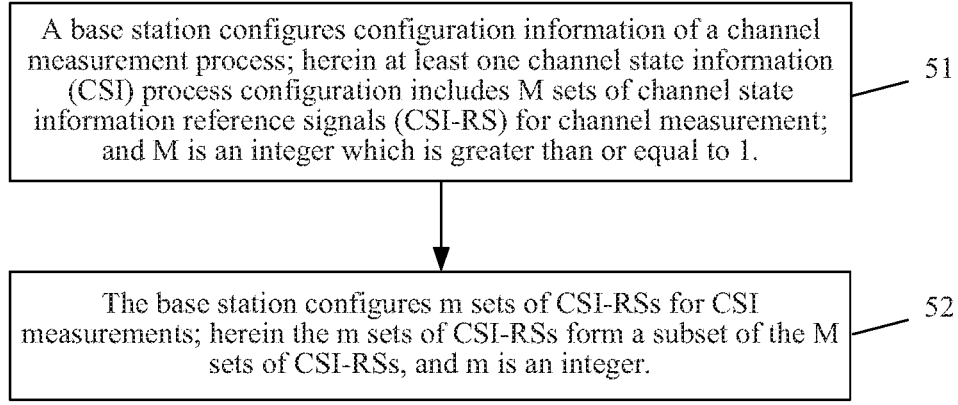
FIG. 5 illustrates another flow diagram of a processing method based on CSI in embodiments of the disclosure.

Correspondingly, FIG. 5 illustrates a processing method based on CSI of the embodiments of the disclosure. The method is applied to a base station and includes the following operations.

At 51, the base station configures configuration information of a channel measurement process, herein at least one CSI process configuration includes M sets of channel state information reference signals (CSI-RS) for channel measurement, and M is an integer which is greater than or equal to 1.

At 52, the base station configures m sets of CSI-RSs for CSI measurements, herein the m sets of CSI-RSs form a subset of the M sets of CSI-RSs, and m is an integer.

In one specific implementation mode of the disclosure, the M sets of CSI-RSs include at least $K_1$ kinds of Class-I CSI-RS pilot resources and $K_2$ kinds of Class-II CSI-RS pilot resources, herein $K_1$ is greater than or equal to 1, and $K_2$ is greater than or equal to 1.

The method further includes the following operations.

The base station configures a pilot set for measurement of channel information according to the $K_1$ kinds of Class-I CSI-RS pilot resources and the $K_2$ kinds of Class-II CSI-RS pilot resources.

The base station informs a terminal of pilots in the pilot set according to at least one of: a configuration signaling of the base station, herein, the configuration signaling includes a DCI signal or an RRC signal, a time domain sending position of the CSI that needs to be fed back, a number of processes that need to be reported simultaneously, or a feedback type which includes periodic feedback or non-periodic feedback.

The pilot set includes one of: $k_1$ kinds of Class-I pilots in the $K_1$ kinds of Class-I CSI-RS pilot resources, $k_1 \leq k_2$ kinds of Class-II pilots in the $K_2$ kinds of Class II CSI-RS pilot resources, $k_2 \leq K_2$; or $k_1$ kinds of Class-I pilots in the $K_1$ kinds of Class-I CSI-RS pilot resources and $k_2$ kinds of Class-II pilots in the $K_2$ kinds of Class-II pilot resources, $k_1 \leq K_1$, and $k_2 \leq K_2$.

Classification of the Class-I CSI-RS pilot resources and the Class-II CSI-RS pilot resources includes one of: way 1: $K_1$ sets of periodic CSI-RS resources, and $K_2$ sets of non-periodic CSI-RS resources; way 2: $K_1$ sets of CSI-RS resources for PUCCH feedback, and $K_2$ sets of CSI-RS resources for PUCCH feedback; way 3: $K_1$ sets of CSI-RS resources using an MR mode, and $K_2$ sets of CSI-RS resources using a Class-II MR mode; way 4: $K_1$ sets of CSI-RS resources configured with a period $T_1$ and $K_2$ sets of CSI-RS resources configured with a period $T_2$; way 5: $K_1$ sets of CSI-RS resources configured with a Class-I trigger mode, and $K_2$ sets of CSI-RS resources configured with a Class-II trigger mode; way 6: periodic CSI-RS resources of $K_1$ ports and non-periodic CSI-RS resources of ports; way 7: CSI-RS resources of the $K_1$ ports for the PUCCH feedback and CSI-RS resources of the $K_2$ ports for the PUSCH feedback; way 8: CSI-RS resources using the Class-I MR mode and of the $K_1$ ports, and CSI-RS resources using the Class-II MR mode and of the $K_2$ ports; way 9: CSI-RS resources configured with the period $T_1$ and of the $K_1$ ports, and CSI-RS resources configured with the period $T_2$ and of the $K_2$ ports; or way 10: CSI-RS resources configured with the Class-I trigger mode and of the $K_1$ ports, and CSI-RS resources configured with the Class-II trigger mode and of the $K_2$ ports.

Figure 6:
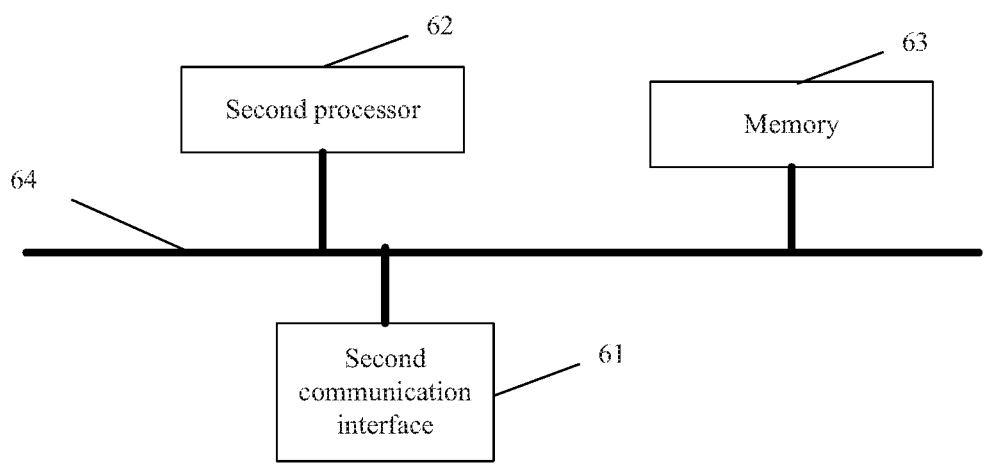
FIG. 6 illustrates a structure diagram of a base station in embodiments of the disclosure.

The embodiments of the disclosure further provide a base station corresponding to the method illustrated in FIG. 5. As illustrated in FIG. 6, the base station includes a second communication interface 61 and a second processor 62.

The second processor 62 is configured to configure configuration information of a channel measurement process through the second communication interface 61; herein, at least one CSI process configuration includes M sets of CSI-RS for channel measurement, and M is an integer which is greater than or equal to 1. The second processor 62 is further configured to configure m sets of CSI-RSs for CSI measurement; herein, m sets of CSI-RSs form a subset of the M sets of CSI-RSs, and m is an integer.

The configuration includes at least $K_1$ kinds of Class-I CSI-RS pilot resources and $K_2$ kinds of Class-II CSI-RS pilot resources in the M sets of CSI-RSs; herein, $K_1$ is greater than or equal to 1, and $K_2$ is greater than or equal to 1.

The second processor 62 is further configured to configure a pilot set for measurement of channel information through the second communication interface 61 according to the $K_1$ kinds of Class-I CSI-RS pilot resources and the $K_2$, kinds of Class-II pilot resources.

It is to be noted that those skilled in the art should understand implementation functions of all units in the terminal illustrated in FIG. 6 may be understood with reference to relevant description of the above-mentioned method.

During actual application, the terminal further includes a memory 63; and the second processor 62, the memory 63 and the second communication interface 61 are connected through a bus 64.

For the above-mentioned processing method based on CSI, several specific application embodiments are listed below.

First Embodiment

The embodiment provides a specific implementation mode of CSI-RS configuration, herein a base station is equipped with Q antenna ports and configures K sets of CSI-RS resources, Q antenna ports are virtualized into $N_k$ CSI-RS ports by using a precoding matrix $P_k$, on the kth set of CSI-RS resources, namely $P_k$ is the matrix of Q rows and $N_k$ columns.

Each set of CSI-RS resources include CSI-RS ports, CSI-RS time-frequency resources, CSI-RS subframe configurations, CSI feedback powers supposed by a UE, ID generation parameters of a CSI-RS sequence, code division multiplexing (CDM) type parameters, and quasi-common location (QCL) parameters.

Figure 7:
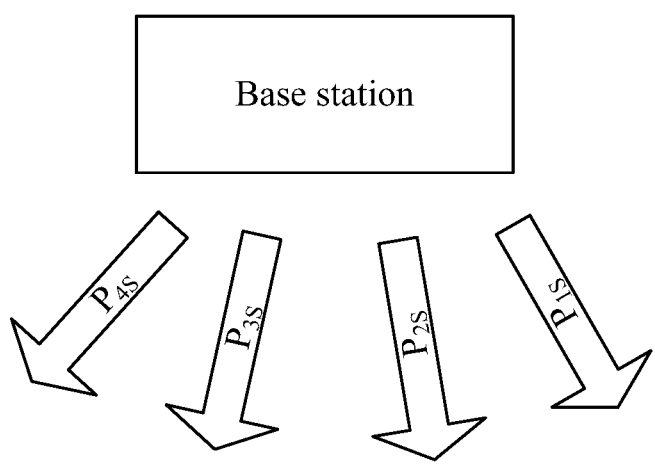
FIG. 7 illustrates a schematic diagram of transmission of a CSI-RS sequence s by a base station by loading the CSI-RS sequence on a K pre-coding matrix $P_1, \ldots, P_K$ in a first embodiment of the disclosure.

As illustrated in FIG. 7, the base station loads a CSI-RS sequence s on K precoding matrixes $P_1, \ldots, P_K$ for transmission, namely BFed CSI-RS sequences $P_{1s}, \ldots, P_{Ks}$ are actually transmitted on each set of CSI-RS resources.

The embodiment provides a precoding pilot (BFed CSI-RS) sending mode, which specifically includes the following operations.

The base station may semi-statically or dynamically configure sending of a CSI-RS sequence. When the base station semi-statically configures the sending of the CSI-RS sequence, the base station informs a terminal of the configuration through an RRC signal; and when the base station dynamically configures the sending of the CSE-RS sequence, the base station informs the terminal of the configuration through a DCI.

The sending of the CSI-RS sequence may be configured as periodic sending or non-periodic sending. Specifically, $K_1$ sets of CSI-RS resources are selected to form a combination 1, and corresponding BFed CSI-RS is sent periodically; and other $K_2=K-K_1$ sets of CSI-RS resources are selected to form a combination 2, and corresponding CSI-RS is sent aperiodically. As for the BFed CSI-RS sent periodically, when no non-periodic BFed CSI-RS is triggered, the terminal selects a CRI having the best quality of an equivalent channel on $K_1$ sets of CSI-RS resources to feed back to the base station, and feeds back one or more of PMI, RI and CQI on corresponding CSI-RS resources. Feedback may be implemented on a PUCCH or a PUSCH as required. When the terminal or the base station triggers sending of non-periodic CSI-RS as required, the base station sends the BFed CSI-RS in the combination 2 on corresponding resources. After the terminal receives the BFed CSI-RS, the terminal jointly selects and feeds back an optimal CRT according to CSI-RS resources in the combination 1 and CSI-RS resources in the combination 2, and feeds back one or more of PMI, RI and CQI on the CSI-RS resources corresponding to the GRI through the PUSCH.

Second Embodiment

The embodiment provides a preceding pilot (BFed CSI-RS) resource configuration manner, which specifically includes the following operations.

A base station configures two kinds of CSI-RSs including periodic CSI-RS and non-periodic CSI-RS. Herein, K sets of CSI-RS resources are configured for a periodic CSI-RS combination 1, and L sets of CSI-RS resources are configured for a non-periodic CSI-RS combination 2.

The base station may semi-statically or dynamically configure sending of a CSI-RS sequence. When the base station configures the sending of the CSI-RS sequence semi-statically, the base station informs a terminal of the configuration through an RRC signal; and when the base station configures the sending of the CSI-RS sequence dynamically, the base station informs the terminal of the configuration through a DCI. As for periodic sending of K sets of CSI-RS resources in the combination 1, the terminal measures, upon receiving the K sets of CSI-RS resources, quality of a channel on each CSI-RS resource and feeds back a CRI corresponding to the optimal CSI-RS resource, and feeds back one or more of corresponding PMI, RI and CQI on a PUCCH periodically. As for L sets of non-periodic CSI-RS resources in the combination 2, the terminal measures, upon receiving the L sets of non-periodic CSI-RS resources, the quality of the channel on each CSI-RS resource and feeds back the CRI corresponding to the optimal CSI-RS resource, and feeds back one or more of the corresponding PMI, RI and CQI on a PUSCH periodically. When CSI-RS resources in the combination 1 exist and CSI-RS resources in the combination 2 are received, the base station determines a precoding matrix for final data transmission flexibly according to feedback situation on the PUSCH and the PUCCH.

Third Embodiment

The embodiment provides a specific implementation mode of CRI feedback under different CSI-RS configurations.

As described in the embodiment 1 and the embodiment 2, a base station configures two CSI-RS combinations including the combination 1 and the combination 2, Herein, the CSI-RS in the combination 1 is sent periodically and includes K CSI-RS resources, and the CSI-RS in the combination 2 is sent aperiodically and includes L CSI-RS resources. When two CSI-RS combinations are configured, a terminal jointly measures quality of a channel on the CSI-RS resources of the combination 1 and of the combination 2, and feeds back a CRI. The feedback may be implemented through one or more of the following modes.

Mode 1: the combination 1 and the combination 2 are jointly processed, and one is selected from K-FL CSI-RS resources for feedback, namely a total number of feedback bits is $\log_2(K+L)$.

Mode 2: the combination 1 and the combination 2 are jointly processed, an optimal CRI is selected from the two combinations, and 1 bit information is used to identify the combination that the CRI belongs to, and a CRI index is determined according to the combination where the CRI is located, namely the total number of feedback bits is $\log_2(K)$ or $\log_2(12)$.

Mode 3: CRIs in the combination 1 and the combination 2 are fed back independently. The CRI in the combination 1 is fed back by making use of a PUSCH, and the CRI in the combination 2 is fed back by making use of a PUCCH, and the base station selects a final pilot precoding matrix flexibly after receiving feedback information on the PUCCH and the PUSCH.

Fourth Embodiment

The embodiment provides a specific implementation mode of precoding pilot (BFed CSI-RS) configuration.

In an existing LIE Rel-13 system, the BFed CSI-RS may be configured only through a RRC signaling semi-statically, with lack of flexibility.

In the embodiment, a base station may flexibly select multiple Med CSI-RS configurations according to a channel state. The base station configures a BFed CSI-RS resource configuration set through a RRC signaling, and the set includes M BFed CSI-RS resource configurations totally, and M is greater than or equal to 1. This set changes semi-statically after being configured through the RRC signal and may be considered unchanged for quite some time. As for m=1, M, a mth BFed CSI-RS resource configuration in the set includes $K_m$ sets of CSI-RS resources.

Each set of CSI-RS resources include following information: CSI-RS ports, CSI-RS time-frequency resources, CSI-RS subframe configurations, CSI feedback powers supposed by a UE, ID generation parameters of a CSI-RS sequence, code division multiplexing (CDM) type parameters, and quasi-common location (QCL) parameters.

Within a semi-static configuration period of the RRC signaling, the base station estimates, before sending the BFed. CSI-RS, a channel preliminarily first according to some prior information, such as channel reciprocity, and dynamically selects N items $m_1, m_2, \ldots, m_N$ accordingly from M CSI-RS resource configurations, Herein, $M \geq n \geq 1$. The base station further informs a terminal of selected N CSI-RS resource configurations through a DCI signaling, and transmits corresponding CSI-RS on a CSI-RS resource union in the N CSI-RS resource configurations. The terminal measures channel quality on corresponding CSI-RS resources according to the DCI and feeds back a CRI having the best channel quality and one or more of corresponding PMI, RI and CQI.

Fifth Embodiment

The embodiment provides a specific implementation mode of precoding pilot (BFed CSI-RS) configuration and feedback.

A base station configures a BFed. CSI-RS resource configuration set through an RRC signaling. The set includes M sets of BFed CSI-RS resource configurations totally, and M is greater than or equal to 1. This set changes semi-statically after being configured through the RRC signaling and may be considered unchanged for quite some time. Within a semi-static configuration period of the RRC signaling, the base station estimates, before sending the BFed CSI-RS, a channel preliminarily first according to some prior information, such as channel reciprocity and accordingly selects, from M sets of CSI-RS resource configurations, $P_1$ sets of CSI-RS resources dynamically or with an agreed manner for PUCCH feedback, and $P_2$ sets of CSI-RS resources dynamically or with the agreed manner for PUSCH feedback. During dynamic configuration, the base station informs a terminal of selected $P_1$ and $P_2$ sets of CSI-RS resource configurations through a DCI signaling. In addition, the terminal may also select configurations of $P_1$ and $P_2$ by taking advantage of channel measurement situation within a time T before, and report the configurations to the base station, and the base station may implement configuration according to a report of a UE.

The terminal selects $p_1$ sets of CSI-RSs on the CSI-RS resources for PUCCH feedback, $p_2$ sets of CSI-RSs on the CSI-RS resources for PUSCH feedback, and selects an optimal CSE-RS resource for feedback through the following modes.

Mode 1: the PUCCH and the PUSCH are jointly processed, and one is selected from $p_1$-$p_2$ CSI-RS resources for feedback, namely a total number of feedback bits is $\log_2(p_1+p_2)$.

Mode 2: CRIs in the PUCCH and the PUSCH are fed back independently. Herein, the CRI in the combination 1 is fed back by making use of the PUSCH, and the CRI in the combination 2 is fed back by making use of the PUCCH. The base station selects a final pilot precoding matrix flexibly after receiving feedback information on the PUCCH and the PUSCH, and the number of feedback bits is $\log_2(p_1)$ or $\log_2(p_2)$.

In addition, the terminal selects to use the PUCCH or PUSCH to feed back one or more of PMI, RI and CQI according to a condition that the selected CRI is on $p_1$ or $p_2$.

Sixth Embodiment

The embodiment provides a specific implementation mode of precoding pilot (Bleed CSI-RS) configuration and feedback. A base station configures a Bleed CSI-RS resource configuration set through an RRC signaling, and the set includes M sets of BFed CSI-RS resource configurations totally, and M is greater than or equal to 1. This set changes semi-statically after being configured through the RRC signaling and may be considered unchanged for quite some time. Within a semi-static configuration period of the RRC signaling, the base station estimates, before sending the BFed CSI-RS, a channel preliminarily first according to some prior information, such as channel reciprocity and accordingly selects, from M sets of CSI-RS resource configurations, $P_1$ sets of CSI-RS resources dynamically or with an agreed manner for periodic sending to form a CSI-RS resource combination 1, and selects $P_2$ sets of CSI-RS resources dynamically or with the agreed manner for non-periodic sending to form a CSI-RS resource combination 2. During dynamic configuration, the base station informs a terminal of selected $P_1$ and $P_2$ sets of CSI-RS resource configurations through a DCI signaling. In addition, the terminal may also select configurations of $P_1$ and $P_2$ by taking advantage of channel measurement situation within a time T before, and report the configurations to the base station, and the base station may implement the configuration according to a report of a UE.

The terminal selects $p_1$ sets of CSI-RSs on the CSI-RS resources that are sent periodically and $p_2$ sets of CSI-RSs on the CSI-RS resources that are sent aperiodically, and selects an optimal CSI-RS resource for feedback through the following modes.

Mode 1: the periodic sending and non-periodic sending are jointly processed, and one is selected from $p_1+p_2$ CSI-RS resources for feedback, namely, a total number of feedback bits is $\log_2(p_1+p_2)$.

Mode 2: CRIs in the periodic sending and non-periodic sending are fed back independently. Herein, the CRI in the combination 1 is fed back by making use of a PUSCH, and the CRI in the combination 2 is fed back by making use of a PUCCH. The base station selects a final pilot precoding matrix flexibly after receiving feedback information on the PUSCH and the PUSCH; and the number of feedback bits is $\log_2(p_1)$ or $\log_2(p_2)$.

In addition, the terminal selects to use the PUSCH or PUSCH to feed back one or more of PMI, RI and CQI according to a condition that the selected CRI is on the combination 1 or the combination 2.

Seventh Embodiment

The embodiment provides a specific implementation mode for a base station to inform a terminal of a CSI-RS configuration. As mentioned in the above embodiments, the base station may configure multiple sets of various CSI-RSs, including periodic CSI-RSs and non-periodic CSI-RSs. In addition, the base station may further send one subset of a CSI-RS configuration set only each time. In order to determine, by the terminal, the CSI-RS resource where a channel is measured, the base station must inform the terminal of CSI-RS resource configuration through some manners. The base station may inform the terminal through the following manners.

Manner 1: an RRC signaling includes information indicating CSI-RS resources.

Manner 2: a DCI signaling includes information indicating CSI-RS resources.

If the manner 1 is used, semi-static changes may occur after configuration, and the configuration will be kept still for quite some time. If the manner 2 is used, the sending of CSI-RS may be dynamic changed each time. In addition, the base station may further inform implicitly through binding the following signaling;

Manner 3: a time domain sending position of the CSI that needs to be fed back.

Herein, the terminal may judge whether the periodic CSI-RS is on the time domain sending position through a period of the periodic CSI-RS and an initial time domain sending position of a CSI-RS.

Manner 4: a number of processes that need to be reported simultaneously.

Herein, when the number of CSI processes to be reported is greater than 1, the non-periodic CSI-RS should not be triggered;

Manner 5: feedback type (periodic or non-periodic).

Specifically, the periodic CSI-RS is used when CSI is fed back periodically, and the non-periodic CSI-RS is used when the CSI is fed back aperiodically.

The base station binds a configuration type to parameters of the manners 3-5 with certain relationship through the agreed manner with the terminal so as to achieve a purpose of informing the terminal of CSI-RS resource configuration.

Eighth Embodiment

The embodiment provides a specific implementation mode for a base station to inform a terminal of a CSI-RS configuration. As mentioned in the above embodiments, the base station may configure various CSI-RSs, including CSI-RSs for PUCCH feedback and CSI-RSs for PUSCH feedback. In addition, the base station may further send one subset of a CSI-RS configuration set only each time. In order to determine, by the terminal, the CSI-RS resource where a channel is measured, the base station must inform the terminal of CSI-RS resource configuration through some manners. The base station may inform the terminal through the following manners.

Manner 1: an RRC signaling includes information indicating CSI-RS resources.

Manner 2: a DCI signaling includes information indicating CSI-RS resources.

If the manner 1 is used, semi-static changes may occur after configuration and the configuration will be kept still for quite some time. If the manner 2 is used, the sending of CSI-RS may be dynamically changed each time. In addition, the base station may further inform implicitly through binding the following signaling;

Manner 3: a time domain sending position of the CSI that needs to be fed back;

Herein, the terminal may judge whether the CSI-RS for periodic feedback is on the time domain sending position through a period of the periodic feedback and an initial time domain sending position of a CSI-RS; the PUCCH feedback should be taken for periodic feedback, and the PUSCH feedback should be taken for non-periodic feedback.

Manner 4: a number of processes that need to be reported simultaneously.

Herein, when the number of CSI processes to be reported is greater than 1, the PUSCH feedback should not be triggered;

Manner 5: feedback type (periodic or non-periodic).

Specifically, the PUCCH feedback should be used for the periodic feedback, and the PUSCH feedback should be used for the non-periodic feedback.

The base station binds a configuration type to parameters of the manners 3-5 with certain relationship through the agreed manner with the terminal so as to achieve a purpose of informing the terminal of CSI-RS resource configuration.

Ninth Embodiment

The embodiment provides a specific implementation mode of periodic and non-periodic CSI-RS configurations. As mentioned in the above embodiments, a terminal may determine $K_1$ sets of CSI-RS resources as periodic CSI-RS resources and $K_2$ sets of CSI-RS resources as non-periodic CSI-RS resources. In fact, each of periodic and non-periodic CSI-RSs has advantages and disadvantages. When a channel changes slowly, configuration of the periodic CSI-RS may lead to channel estimation with slight changes; moreover, when the channel changes quickly, the non-periodic CSI-RS may be triggered for too many times if the non-periodic CSI-RS is configured, thereby leading to a great overhead. Therefore, whether to simultaneously configure the periodic and periodic CSI-RSs should be determined according to a scenario. In the scenario where the channel changes quickly, such as the scenario moving at a high speed, the periodic CSI-RS may be configured only, namely $K_{2=0}$; and in the scenario that the channel does not change substantially along the time, such as a slow fading scenario where the terminal does not move, the non-periodic CSI-RS may be configured only, namely K1=0.

Tenth Embodiment

The embodiment provides a specific implementation mode of CSI-RS configurations for PUCCH feedback and PUSCH feedback. As mentioned in the above embodiments, a terminal may determine P1 sets of CSI-RS resources for the PUCCH feedback and P2 sets of CSI-RS resources for the PUSCH feedback. In fact, each of the PUSCH feedback and the PUCCH feedback has advantages and disadvantages. When a channel changes slowly, configuration of the PUCCH feedback may lead to channel estimation with slight changes; moreover, when the channel changes quickly, the PUSCH feedback may be triggered for too many times if the PUSCH feedback is configured, thereby leading to a great overhead. Therefore, whether to simultaneously configure the CSI-RS resources of the PUSCH feedback and of the PUCCH feedback should be determined according to a scenario. In the scenario where the channel changes quickly, such as the scenario moving at a high speed, the CSI-RS resources for the PUCCH feedback may be configured only, namely P2=0; and in the scenario that the channel does not change substantially along the time, such as a slow fading scenario where the terminal does not move, the CSI-RS resources for the PUSCH feedback may be configured only, namely P1=0.

Eleventh Embodiment

The embodiment provides a specific implementation mode of a non-preceding CSI-RS configuration. A base station configures a non-precoding CSI-RS resource configuration set through an RRC signaling. The set includes one set of NP CSI-RS resource configuration totally, which changes semi-statically after being configured through the RRC signaling and may be considered unchanged for quite some time. Within a semi-static configuration period of the RRC signaling, the base station estimates, before sending the NP CSI-RS, a channel preliminarily first according to some prior information, such as channel reciprocity and accordingly selects, from the NP CSI-RS resource configuration, CSI-RS resources of T1 ports dynamically or with an agreed manner for periodic sending to form a CSI-RS port combination 1, and selects CSI-RS resources of T2 ports dynamically or with the agreed manner for non-periodic sending to form a CSI-RS port combination 2. During dynamic configuration, the base station informs a terminal of selected CSI-RS resource configurations of the T1 ports and the T2 ports through a DC1 signaling. In addition, the terminal may also select configurations of the $T_1$ and the T2 by taking advantage of the channel measurement situation within a time T before, and report to the base station. The base station may implement the configuration according to a report of a UE. Herein, configuration of measurement restriction (MR) should be considered as for setting of the T, and when X=Y=1 is configured for MR, channel measurement and interference may be implemented in one subframe only.

In order to balance channel estimation performances and a pilot overhead, the combination 1 and combination 2 may be configured with different densities during configuring the combination 1 and combination 2. One reasonable configuration is that a traditional 1 RE/RB/port is configured for a periodic pilot to ensure quality of periodic channel estimation, and a small density is configured for a non-periodic pilot, such as a 0.5 RE/RB/port. In this way, no large pilot overhead would occur when a non-periodic CSI-RS is triggered.

Twelfth Embodiment

The embodiment provides a specific implementation mode of a non-precoding CSI-RS configuration. A base station configures a non-precoding CSI-RS resource configuration set through an RRC signaling. The set includes one set of NP CSI-RS resource configuration totally, and the set changes semi-statically after being configured through the RRC signaling and may be considered unchanged for quite some time. Within a semi-static configuration period of the RRC signal, the base station estimates, before sending the NP CSI-RS, a channel preliminarily first according to some prior information, such as channel reciprocity and accordingly selects, from the NP CSI-RS resource configuration, CSI-RS resources of RI ports dynamically or with an agreed manner for PUCCH feedback to form a CSI-RS port combination 1, and selects CSI-RS resources of R2 ports dynamically or with the agreed manner for PUSCH feedback to form a CSI-RS port combination 2. During dynamic configuration, the base station informs a terminal of selected CSI-RS resource configurations of the R1 ports and of R2 ports through a DCI signaling. In addition, the terminal may also select configurations of the RI and R2 by taking advantage of the channel measurement situation within a time T before, and report to the base station. The base station may implement the configuration according to a report of a UE. Herein, configuration of MR should be considered as for setting of the T; and when X=Y=1 is configured for MR, channel measurement and interference may be implemented in one subframe only.

In order to balance channel estimation performances and a pilot overhead, the combination 1 and combination 2 may be configured with different densities during configuring the combination 1 and combination 2. One reasonable configuration is that a traditional 1 RE/RB/port is configured for the PUCCH feedback to ensure quality of periodic feedback, and a small density is configured for the PUSCH feedback, such as a 0.5 RE/RB/port. In this way, no large pilot overhead would occur when a non-periodic feedback is triggered.

Thirteenth Embodiment

The embodiment provides a specific implementation mode of periodic and non-periodic CSI-RS configurations. As mentioned in the above embodiments, CSI-RS resources of T1 ports may be configured as periodic CSI-RS resources, and CSI-RS resources of T2 ports may be configured as non-periodic CSI-RS resources. In fact, each of periodic and non-periodic CSI-RSs has advantages and disadvantages. When a channel changes slowly, configuration of the periodic CSI-RS may lead to channel estimation with slight changes; on the other hand, when the channel changes quickly, the non-periodic CSI-RS may be triggered for too many times if the non-periodic CSI-RS is configured, thereby leading to a great overhead. Therefore, whether to simultaneously configure the periodic and periodic CSI-RSs should be determined according to a scenario. In the scenario where the channel changes quickly, such as the scenario moving at a high speed, the periodic CSI-RS may be configured only, namely T2=0; and in the scenario that the channel does not change substantially along the time, such as a slow fading scenario where a terminal does not move, the non-periodic CSI-RS may be configured only, namely T1=0.

Fourteenth Embodiment

The embodiment provides a specific implementation mode of CSI-RS configurations for PUCCH feedback and PUSCH feedback. As mentioned in the above embodiments, a terminal may determine CSI-RS resources of RI ports for the PUCCH feedback, and the CSI-RS resources of R2 ports for the PUSCH feedback. In fact, each of the PUSCH feedback and the PUCCH feedback has advantages and disadvantages. When a channel changes slowly, configuration of the PUCCH feedback may lead to channel estimation with slight changes; on the other hand, when the channel changes quickly, the PUSCH feedback may be triggered for too many times if the PUSCH feedback is configured, thereby leading to a great overhead. Therefore, whether to simultaneously configure the CSI-RS resources of the PUSCH feedback and of the PUCCH feedback should be determined according to a scenario. In the scenario where the channel changes quickly, such as the scenario moving at a high speed, the CSI-RS resources for the PUCCH feedback may be configured only, namely R2=0; and in the scenario that the channel does not change substantially along the time, such as a slow fading scenario where the terminal does not move, the CSI-RS resources for the PUSCH feedback may be configured only, namely R1=0.

Fifteenth Embodiment

The embodiment provides classification ways of Class-I and Class-II CSI-RSs. The previous embodiments have provided multiple classification ways, for example, classification according to a periodic CSI-RS or a non-periodic CSI-RS, classification according to a port, classification according to PUCCH feedback or PUSCH feedback, etc. The embodiment provides some other classification ways, and other processing and configuration procedures or methods may be implemented with reference to other embodiments after classification.

Classification may be implemented according to different MR configurations. The MR is used to restrict the time during which the sent CSI-RS measures channel information. Configuration of various MRs may make some CSI-RSs acquire long-term information of a channel within a long time, while some other CSI-RS may acquire relatively instant channel information within a short time. Therefore, complete channel information may be acquired through jointly processing the CSI-RSs of different MR configurations, and because the MR is configured for long-term measurement, the CSI-RSs are not required to be sent frequently, pilots and feedback overheads generated are within an acceptable range accordingly. As for the situation that many sets of CSI-RS resources are configured, M1 sets of MRs may be configured as long-term measurement, while other M2 sets of MRs may be configured as short-term measurement. As for the situation that one set of CSI-RS resource is configured only, classification may be implemented through different ports, namely the MRs of CSI-RSs of M1 ports are configured as long-term measurement, while the MRs of CSI-RSs of other M2 ports are configured as short-term measurement.

The classification may be implemented according to different periods. When the CSI-RSs are configured as periodic CSI-RSs, joint processing may be achieved through configurations of different periods to acquire long-term channel information and instant channel information. Specifically, a sending period of the Class-I CSI-RS is configured as $T_1$, and the sending period of the Class-II CSI-RS is configured as $T_2$ when $T_1 > T_2$, the long-term channel information may be acquired through the Class-I CSI-RS, and the instant channel information may be acquired through the Class-II CSI-RS, and the complete channel information may be acquired through joint processing. In addition, because the long-period CSI-RS is not required to be sent frequently, the pilot and feedback overhead may also be controlled within the acceptable range. As for the situation that many sets of CSI-RS resources are configured, $M_1$ sets of CSI-RS resources may be configured for sending within a long period, while other $M_2$ sets of CSI-RSs may be configured for sending within a short period. As for the situation that one set of CSI-RS resource is configured only, classification may be implemented through different ports, namely CSI-RSs of $M_1$ ports are configured for sending within the long period, while CSI-RSs of other $M_2$ ports are configured for sending within the short period.

The classification may be implemented according to different trigger modes. For example, different trigger modes are configured for the CSI-RSs, specifically the trigger mode 0 is configured for periodic feedback, and the trigger mode 1 is configured for non-periodic feedback.

Compared with the conventional art, in the solutions of the embodiments of the disclosure, a terminal acquires configuration information of a channel measurement process, herein at least one CSI process configuration includes M sets of CSI-RSs for channel measurement, and M is an integer which is greater than or equal to 1. The terminal determines m sets of CSI-RSs for CSI measurement, the m sets of CSI-RSs form a subset of the M sets of CSI-RSs, and m is an integer. In this way, CSI-RS sending and CSI feedback may be changed flexibly according to a channel state.

Those skilled in the art should understand that the embodiments of the disclosure may provide a method, a system or a computer program product. Thus, forms of hardware embodiments, software embodiments or embodiments integrating software and hardware may be adopted in the disclosure. Moreover, a form of the computer program product implemented on one or more computer available storage media (including, but not limited to, a disk memory, an optical memory and the like) containing computer available program codes may be adopted in the disclosure.

The disclosure is described with reference to flowcharts and/or block diagrams of the method, the equipment (system) and the computer program product according to the embodiments of the disclosure. It should be understood that each flow and/or block in the flowcharts and/or the block diagrams and a combination of the flows and/or the blocks in the flowcharts and/or the block diagrams may be realized by computer program instructions. These computer program instructions may be provided for a general computer, a dedicated computer, an embedded processor or processors of other programmable data processing devices to generate a machine, so that an apparatus for realizing functions assigned in one or more flows of the flowcharts and/or one or more blocks of the block diagrams is generated via instructions executed by the computers or the processors of the other programmable data processing devices.

These computer program instructions may also be stored in a computer readable memory capable of guiding the computers or the other programmable data processing devices to work in a specific implementation mode, so that a manufactured product including an instruction apparatus is generated via the instructions stored in the computer readable memory, and the instruction apparatus realizes the functions assigned in one or more flows of the flowcharts and/or one or more blocks of the block diagrams.

These computer program instructions may also be loaded to the computers or the other programmable data processing devices, so that processing realized by the computers is generated by executing a series of operations on the computers or the other programmable devices, and therefore the instructions executed on the computers or the other programmable devices provide operations for realizing the functions assigned in one or more flows of the flowcharts and/or one or more blocks of the block diagrams.

On this basis, the embodiments of the disclosure further provides a computer storage medium, the computer storage medium includes a group of instructions that when executed by at least one processor, cause the at least one processor to perform the processing method based on CSI on a terminal side described above, or implement the processing method based on the CSI on a base station side described above.

Although the embodiments disclosed by the disclosure are described above, the stated contents are embodiments to be adopted to facilitate understanding of the disclosure and not intended to limit the disclosure. Any of those skilled in the art is allowed to make any modifications and changes in forms and details without departing from the spirit and scope of the disclosure. However, scope of protection of the disclosure is defined by attached claims.

INDUSTRIAL APPLICABILITY

According to the solutions provided by the embodiments of the disclosure, a terminal acquires configuration information of a channel measurement process. Herein, at least one CSI process configuration includes M sets of CSI-RS for channel measurement, and M is an integer which is greater than or equal to 1. The terminal determines in sets of CSI-RSs for CSI measurement, and the in sets of CSI-RSs form a subset of the M sets of CSI-RSs, and m is an integer. In this way, CSI-RS sending and CSI feedback may be flexibly changed according to a channel state.

The invention claimed is:

1. A processing method based on channel state information (CSI), comprising:
    acquiring, by a terminal, configuration information of a channel measurement process, wherein at least one CSI process configuration comprises M sets of channel state information reference signals (CSI-RSs) for CSI measurement, and M is an integer which is greater than or equal to 1; and
    determining, by the terminal, m sets of CSI-RSs for CSI measurement, the m sets of CSI-RSs being a subset of the M sets of CSI-RSs, wherein m is an integer;
    wherein the M sets of CSI-RSs comprise at least $K_1$ kinds of Class-I CSI-RS pilot resources and $K_2$ kinds of Class-II CSI-RS pilot resources, wherein $K_1 \geq 1$, and $K_2 \geq 1$; and
    the method further comprises: determining, by the terminal, a pilot set for CSI measurement according to the $K_1$ kinds of Class-I CSI-RS pilot resources and the $K_2$ kinds of Class-II CSI-RS pilot resources, and performing CSI measurement feedback according to pilots in the pilot set.

2. The method of claim 1, wherein the pilot set comprises one of:
   $k_1$ kinds of Class-I pilots in the $K_1$ kinds of Class-I CSI-RS pilot resources, $k_1 \leq K_1$;
   $k_2$ kinds of Class-II pilots in the $K_2$ kinds of Class-II CSI-RS pilot resources, $k_2 \leq K_2$; or
   $k_1$ kinds of Class-I pilots in the $K_1$ kinds of Class-I CSI-RS pilot resources and $k_2$ kinds of Class-II pilots in the $K_2$ kinds of Class-II CSI-RS pilot resources, $k_1 \leq K_1$, and $k_2 \leq K_2$.

3. The method of claim 1, wherein determining, by the terminal, the pilots in the pilot set according to at least one of:
   a configuration signaling of a base station, the configuration signaling comprising a downlink control information (DCI) signal or radio resource control (RRC) signal;
   a time domain sending position of the CSI that needs to be fed back;
   a number of processes that need to be reported simultaneously; or
   a feedback type which comprises periodic feedback or non-periodic feedback.

4. The method of claim 2, wherein the terminal determines a value of $k_1$ according to sending situation of the $K_1$ kinds of Class-I CSI-RS pilot resources within a time range T.

5. The method of claim 2, wherein the terminal determines a value of $k_2$ according to sending situation of the $K_2$ kinds of Class-II CSI-RS pilot resources within a time range T.

6. The method of claim 2, wherein the terminal and a base station agree on at least one of $k_1=K_1$ or $k_2=K_2$.

7. The method of claim 1, wherein classification of the Class-I CSI-RS pilot resources and the Class-II CSI-RS pilot resources comprise one of:
   way 1: $K_1$ sets of periodic CSI-RS resources, and $K_2$ sets of non-periodic CSI-RS resources;
   way 2: $K_1$ sets of CSI-RS resources for physical uplink control channel (PUCCH) feedback, and $K_2$ sets of CSI-RS resources for physical uplink shared channel (PUSCH) feedback;
   way 3: $K_1$ sets of CSI-RS resources using a Class-I measurement restriction (MR) mode, and $K_2$ sets of CSI-RS resources using a Class-II MR mode;
   way 4: $K_1$ sets of CSI-RS resources configured with a period $T_1$ and $K_2$ sets of CSI-RS resources configured with a period $T_2$;
   way 5: $K_1$ sets of CSI-RS resources configured with a Class-I trigger mode, and $K_2$ sets of CSI-RS resources configured with a Class-II trigger mode;
   way 6: periodic CSI-RS resources of $K_1$ ports and non-periodic CSI-RS resources of $K_2$ ports;
   way 7: CSI-RS resources of the $K_1$ ports for the PUCCH feedback and CSI-RS resources of the $K_2$ ports for the PUSCH feedback;
   way 8: CSI-RS resources using the Class-I MR mode and of the $K_1$ ports, and CSI-RS resources using the Class-II MR mode and of the $K_2$ ports;
   way 9: CSI-RS resources configured with the period $T_1$ and of the $K_1$ ports, and CSI-RS resources configured with the period $T_2$ and of the $K_2$ ports; or
   way 10: CSI-RS resources configured with the Class-I trigger mode and of the $K_1$ ports, and CSI-RS resources configured with the Class-II trigger mode and of the $K_2$ ports.

8. The method of claim 7, wherein performing the CSI measurement feedback according to the pilots in the pilot set comprises:
   when the Class-I CSI-RS pilot resources and the Class-II CSI-RS pilot resources are classified according to one of the ways 1-5, feeding back, by the terminal, a CSI-RS resource index (CRI) through $\log 2(k_1+k_2)$ bit information, or feeding back, by the terminal, a CRI through $\log_2(k_2)$ bit information, or feeding back, by the terminal, a CRI through $\log_2(k_1)$ bit information.

9. A processing method based on channel state information (CSI), comprising:
   configuring, by a base station, configuration information of a channel measurement process, wherein at least one CSI process configuration comprises M sets of channel state information reference signals (CSI-RSs) for CSI measurement, and M is an integer which is greater than or equal to 1; and
   configuring, by the base station, m sets of CSI-RSs for CSI measurement, the m sets of CSI-RSs being a subset of the M sets of CSI-RSs, wherein m is an integer;
   wherein the M sets of CSI-RSs comprise at least $K_1$ kinds of Class-I CSI-RS pilot resources and $K_2$ kinds of Class-II CSI-RS pilot resources, wherein $K_1 \geq 1$, and $K_2 \geq 1$; and
   the method further comprises: configuring, by the base station, a pilot set for CSI measurement according to the $K_1$ kinds of Class-I CSI-RS pilot resources and the $K_2$ kinds of Class-II CSI-RS pilot resources.

10. The method of claim 9, wherein the pilot set comprises one of:
    $k_1$ kinds of Class-I pilots in the $K_1$ kinds of Class-I CSI-RS pilot resources, $k_1 \leq K_1$;
    or $k_2$ kinds of Class-II pilots in the $K_2$ kinds of Class-II CSI-RS pilot resources, $k_2 \leq K_2$; or
    $k_1$ kinds of Class-I pilots in the $K_1$ kinds of Class-I CSI-RS pilot resources and $k_2$ kinds of Class-II pilots in the $K_2$ kinds of Class-II CSI-RS pilot resources, $k_1 \leq K_1$, and $k_2 \leq K_2$.

11. The method of claim 9, wherein the base station informs a terminal of pilots in the pilot set according to at least one of:
    a configuration signaling of the base station, the configuration signaling comprising a downlink control information (DCI) signal or radio resource control (RRC) signal;
    a time domain sending position of the CSI that needs to be fed back;
    a number of processes that need to be reported simultaneously; or
    a feedback type which comprises periodic feedback or non-periodic feedback.

12. The method of claim 9, wherein classification of the Class-I CSI-RS pilot resources and the Class-II CSI-RS pilot resources comprises one of:
    way 1: $K_1$ sets of periodic CSI-RS resources, and $K_2$ sets of non-periodic CSI-RS resources;
    way 2: $K_1$ sets of CSI-RS resources for physical uplink control channel (PUCCH) feedback, and $K_2$ sets of CSI-RS resources for physical uplink shared channel (PUSCH) feedback;

way 3: K1 sets of CSI-RS resources using a Class-I measurement restriction (MR) mode, and $K_2$ sets of CSI-RS resources using a Class-II MR mode;

way 4: $K_1$ sets of CSI-RS resources configured with a period $T_1$ and $K_2$ sets of CSI-RS resources configured with a period $T_2$;

way 5: $K_1$ sets of CSI-RS resources configured with a Class-I trigger mode, and $K_2$ sets of CSI-RS resources configured with a Class-II trigger mode;

way 6: periodic CSI-RS resources of $K_1$ ports and non-periodic CSI-RS resources of $K_2$ ports;

way 7: CSI-RS resources of the $K_1$ ports for the PUCCH feedback and CSI-RS resources of the $K_2$ ports for the PUSCH feedback;

way 8: CSI-RS resources using the Class-I MR mode and of the $K_1$ ports, and CSI-RS resources using the Class-II MR mode and of the $K_2$ ports;

way 9: CSI-RS resources configured with the period $T_1$ and of the $K_1$ ports, and CSI-RS resources configured with the period $T_2$ and of the $K_2$ ports; or way 10: CSI-RS resources configured with the Class-I trigger mode and of the $K_1$ ports, and CSI-RS resources configured with the Class-II trigger mode and of the $K_2$ ports.

13. A terminal, comprising:

a first communication interface, configured to acquire configuration information of a channel measurement process, wherein at least one channel state information (CSI) process configuration comprises M sets of channel state information reference signals (CSI-RSs) for CSI measurement; and M is an integer which is greater than or equal to 1; and a first processor, configured to determine m sets of CSI-RSs for CSI measurement; the m sets of CSI-RSs being a subset of the M sets of CSI-RSs, wherein m is an integer;

wherein the M sets of CSI-RSs comprise at least $K_1$ kinds of Class-I CSI-RS pilot resources and $K_2$ kinds of Class-II CSI-RS pilot resources, wherein $K_1 \geq 1$, and $K_2 \geq 1$; and the first processor is further configured to determine a pilot set for CSI measurement according to the $K_1$ kinds of Class-I CSI-RS pilot resources and the $K_2$ kinds of Class-II CSI-RS pilot resources, and perform CSI measurement feedback through the first communication interface according to pilots in the pilot set.

14. The terminal of claim 13, wherein the pilot set comprises one of:

$k_1$ kinds of Class-I pilots in the $K_1$ kinds of Class-I CSI-RS pilot resources, $k_1 \leq K_1$;

$k_2$ kinds of Class-II pilots in the $K_2$ kinds of Class-II CSI-RS pilot resources, $k_2 \leq K_2$; or $k_1$ kinds of Class-I pilots in the $K_1$ kinds of Class-I CSI-RS pilot resources and $k_2$ kinds of Class-II pilots in the $K_2$ kinds of Class-II CSI-RS pilot resources, $k_1 \leq K_1$, and $k_2 \leq K_2$.

15. The terminal of claim 13, wherein the first processor is further configured to determine the pilots in the pilot set according to at least one of:

a configuration signaling of a base station, the configuration signaling comprising a downlink control information (DCI) signal or radio resource control (RRC) signal;

a time domain sending position of the CSI that needs to be fed back;

a number of processes that need to be reported simultaneously; or a feedback type which comprises periodic feedback or non-periodic feedback.

16. The terminal of claim 14, wherein the first processor is further configured to determine a value of $k_1$ according to sending situation of the $K_1$ kinds of Class-I CSI-RS pilot resources within a time range T.

17. The terminal of claim 14, wherein the terminal determines a value of $k_2$ according to sending situation of the $K_2$ kinds of Class-II CSI-RS pilot resources within a time range T.

* * * * *